United States Patent [19]

Haigo et al.

[11] Patent Number: 4,974,937
[45] Date of Patent: Dec. 4, 1990

[54] COLOR FILTER UNIT

[75] Inventors: Hideaki Haigo, Nagoya; Kiyoharu Hayakawa, Aichi, both of Japan

[73] Assignee: Brother Kogyo Kabushiki Kaisha, Aichi, Japan

[21] Appl. No.: 490,429

[22] Filed: Mar. 8, 1990

[30] Foreign Application Priority Data

Mar. 13, 1989 [JP] Japan .................................. 1-57869

[51] Int. Cl.⁵ .......................... G02B 5/22; G02B 7/00; G03B 27/32; G03B 27/72
[52] U.S. Cl. .................................... 350/316; 350/315; 350/318; 355/27; 355/35
[58] Field of Search .............................. 350/315–318; 355/27, 35, 38

[56] References Cited

U.S. PATENT DOCUMENTS 4,924,255  5/1990  Honaguchi et al. ................ 355/27

Primary Examiner—Bruce Y. Arnold
Assistant Examiner—James Phan
Attorney, Agent, or Firm—Oliff & Berridge

[57] ABSTRACT

A filter unit includes a plurality of filter members, a filter drive mechanism, and a switching mechanism. One of the filter members is continuously engaged with the filter drive mechanism, so that it is moved toward and away from an optical path extending between an exposure light source and an image recording medium. On the other hand, remaining filter members are selectively engageable with the filter drive mechanism. This selective engagement is provided by the switching mechanism. After remaining one of the filters is selected and engaged with the filter drive mechanism, the selected filter is moved toward the optical path. In this instance, the filter member always engageable with the filter drive mechanism is retracted from the optical path.

10 Claims, 2 Drawing Sheets

FIG. 3
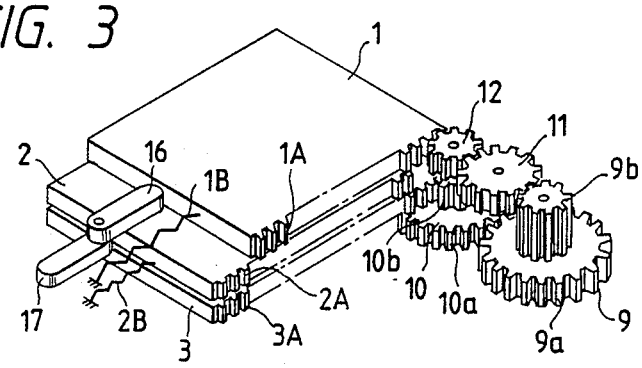
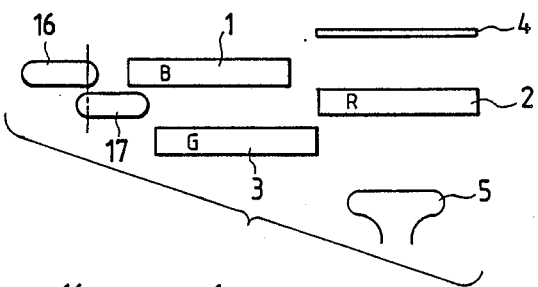
FIG. 4(a)
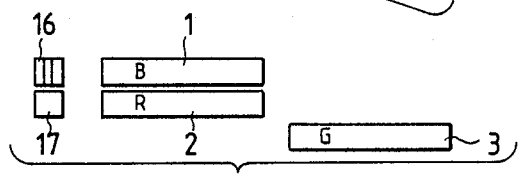
FIG. 4(b)
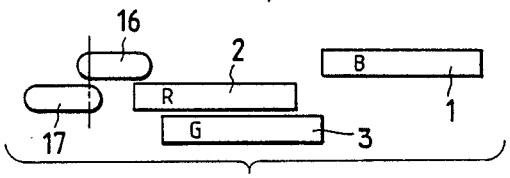
FIG. 4(c)
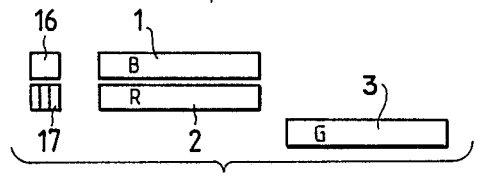
FIG. 4(d)
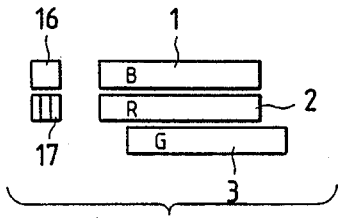
FIG. 4(e)

COLOR FILTER UNIT

BACKGROUND OF THE INVENTION

The present invention relates to a color filter unit, and more particularly to a filter drive unit for selectively positioning one of color filter members to a position in an exposure device.

In one type of an exposure device, a monochromatic CRT is used for displaying a monochromatic image and one of red, green and blue filter members is selectively positioned between the CRT screen and a photosensitive surface of a photosensitive sheet. The CRT serves as a light source as well as an original image source, which image is focussed on the photosensitive surface for exposure through the selected one of the filter members.

According to a conventional filter unit, a circular filter plate is divided into three sections at equi-angular arrangement such as by every 120 degrees so as to provide three color filters on the circular plate. If the CRT displays an image indicative of red color data on its CRT screen, a red filter is rotationally positioned between the CRT screen and the photosensitive surface of the photosensitive sheet. The same is true with respect to images indicative of green and blue color data. Further, in case of the white color data, no filter is positioned in front of the CRT screen.

According to another type of a conventional filter unit, these color filters are arranged in a linear array, and one of the color filters is selectively positioned at an optical path by linear motion of the filter unit.

The filter unit is generally assembled at a narrow space, and there has been a spacial problems for assembling the filter unit in such a narrow space of the exposure de vice, and in extreme cases, the filter unit cannot be installed in the exposure device due to spacial problems. Further, if one of the filters is intended to be replaced by remaining one of the filters, the one filter is moved, and then the intended filter is brought to the given position at the optical path. Therefore, filter switching requires relatively prolonged period.

Incidentally a co-pending U.S. Pat. application Ser. No. 260,034 filed on Oct. 20, 1988 discloses color control filter unit movably disposed at a light path.

SUMMARY OF THE INVENTION

It is therefore, an object of the present invention to provide an improved color filter unit or a filter drive unit having simple construction with minimized external dimension.

Another object of the invention is to provide the filter unit capable of reducing period for moving and switching color filter members with respect to an optical path by moving a filter already positioned at the optical path to the outside of the optical path and simultaneously moving another filter member toward the optical path.

These and other objects of the present invention will be attained by providing a color filter unit positioned adjacent an optical path defined between an exposure source and an image recording medium, the unit comprising: (a) a plurality of filter members comprising a first filter member having a first color filter and a first external frame formed with a first rack, a second filter member having a second color filter and a second external frame formed with a second rack, and a third filter member having a third color filter and a third external frame formed with a third rack, (b) a filter drive mechanism comprising a first drive source, a first filter drive gear driven by the first drive source and continuously engageable with a first rack, a second filter drive gear driven by the first drive source and engageable with one of the second and third racks, the second filter drive gear being rotated in a direction opposite the rotating direction of the first filter drive gear, and (c) a switch mechanism for providing selective engagement of one of the second and third racks with the second filter drive gear.

In another aspect of the invention there is provided a filter unit positioned adjacent an optical path defined between an exposure source and an image recording medium comprising: (a) a plurality of filter members comprising a first filter member having a first color filter and a first external frame formed with a first rack, a second filter member having a second color filter and a second external frame formed with a second rack, and a third filter member having a third color filter and a third external frame formed with a third rack, (b) a filter drive mechanism comprising a first drive source selectively rotatable in one direction and another direction, a first filter drive gear driven by the first drive source and continuously engageable with a first rack, the first filter drive gear being rotated in a direction the same as the rotating direction of the first drive source, the first filter member being introduced into the optical path in response to the rotation of the first filter drive gear in the one direction, and being retracted from the optical path to restore its rest position in response to the rotation of the first filter drive gear in the another direction, a second filter drive gear driven by the first drive source and selectively engageable with one of the second and third racks, the second filter drive gear being rotated in a direction opposite the rotating direction of the first filter drive gear, the one of the second and third filter members being introduced into the optical path in response to the rotation of the second filter drive gear in the one direction, and being retracted therefrom to restore their rest positions in response to the rotation of the second filter drive gear in the another direction to, and (c) a switch mechanism for providing engagement of one of the second and third racks with the second filter drive gear, the switch mechanism comprising a second drive source rotatable in one direction, urging means connected to the second drive source for selectively urging one of the second and third filter members toward the optical path and biasing means connected to the second filter member and the third filter member for retracting the second and third filter members from the optical path, the first, second and third filter members being selectively restoring their rest positions simultaneously to provide a white light irradiation onto the image recording medium.

If the second filter member is selected by the switching mechanism, the second rack provided at the second frame is brought into meshing engagement with the second filter drive gear by the actuation of the urging means. After the engagement, if the second filter drive gear is rotated in the one direction, the second filter member is further moved, so that it is moved to the optical path defined between the exposure source and the image recording medium. If the urging means of the switch mechanism is of idle state, while the second filter drive gear is rotated in the another direction, the second filter member is retracted from the optical path, and instead, the first filter member is moved to the optical path because of the rotation of the first filter drive gear in the one direction.

Then, if the third filter member is selected, the third rack is brought into meshing engagement with the second filter drive gear upon actuation of the urging means. Thereafter, by rotating the second filter drive gear in the one direction, the third filter member is moved to the optical path, whereas the first filter member is retracted from the optical path because of the rotation of the first filter drive gear in the another direction. Therefore, one of the filter members can be selectively introduced into the optical path, and at the same time, the remaining one of the filter members can be simultaneously retracted from the optical path. Such concurrent movements of the filter members can be provided by the selection or non-selection of the second and third filter members by the switch mechanism, and change in rotational directions of the first and second filter drive gears in the drive mechanism. Further, all of the filter members can be retracted from the optical path for exposing the recording medium to white light.

BRIEF DESCRIPTION OF THE DRAWINGS

In the drawings;

FIG. 3 is a perspective view showing the gear train and the filters in a color filter unit according to this invention; and FIGS. 4(a) thru 4(e) are schematic illustrations for description of movement of the filter members according to the present invention.

DETAILED DESCRIPTION OF THE PREFERRED EMBODIMENTS

Figure 1:
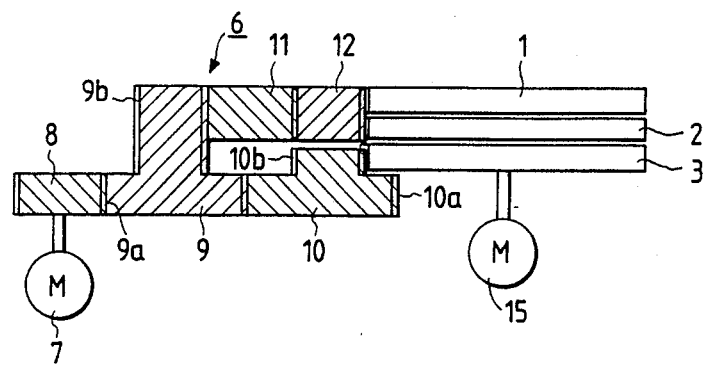
FIG. 1 is a cross-sectional side view showing a gear train and filters in a color filter unit according to the present invention.
Figure 2:
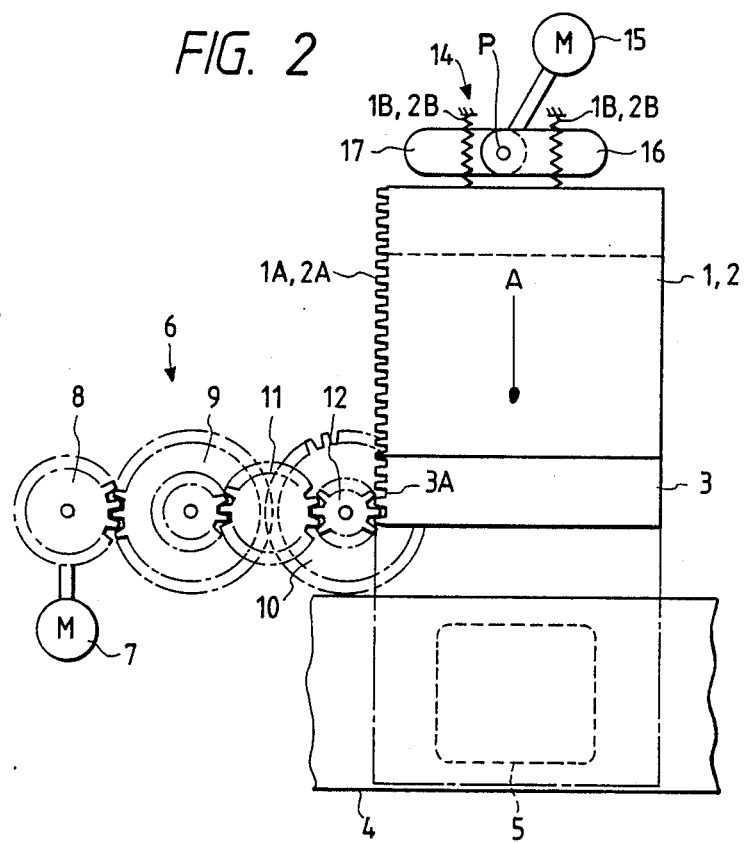
FIG. 2 is a plane view showing the gear train and the filters in a color filter unit according to this invention.

A color filter unit according to one embodiment of the present invention is shown in FIGS. 1 thru 3. Blue filter 1, red filter 2 and green filter 3 have rectangular shapes, and these are stackedly arranged as best shown in FIG. 1. Each of the filters has filter frames whose side wall is formed with racks 1A, 1B and 1C. One of the filters is selectively positioned at a position between an exposure light source CRT 5 and a photosensitive sheet 4 on which an image of the CRT screen is focussed (see FIGS. 4(a)-4(e)). These filters 1, 2 and 3 are selectively movable to the position by means of a drive mechanism 6 and a switch mechanism 14.

The drive mechanism 6 includes a drive motor 7, a drive gear 8, a first idle gear 9, a first filter drive gear 10, a second idle gear 11, and a second filter drive gear 12. More specifically, the drive gear 8 is drivingly coupled to the drive motor 7, and the first idle gear 9 is meshedly engaged with the drive gear 10. the first idle gear 9 has a large gear 9a and a small gear 9b concentrically arranged with each other, and the large gear 9a is in meshing engagement with the drive gear 8. The first filter drive gear 10 has a large diameter gear 10a and a small diameter gear 10b, and the large diameter gear 10a is meshedly engaged with the large gear 9a of the first idle gear 9. The small diameter gear 10b of the of the first filter drive gear 10 is in continuous meshing engagement with a rack 3A of the green filter 3. The small gear 9b of the first idle gear 9 is meshedly engaged with the second idle gear 11 which is also meshedly engaged with the second filter drive gear 12. The second filter drive gear 12 is disposed concentrical with the first filter drive gear 10, and is selectively engageable with one of the racks 1A and 2A of the blue filter 1 and the red filter 2. This selective engagement is defined by the switch mechanism 4. Incidentally, the second filter drive gear 2 is rotated in a direction opposite the rotational direction of the first filter drive gear 10.

The switch mechanism 14 includes a first cam 16, a second cam 17, a cam drive motor 15 and biasing means such as coil springs 1B and 2B. The first and second cams are referred to as urging means for urging the filter members 1 and 2 toward the optical path. The first cam 16 is positioned in alignment with the blue filter 1 so as to pivotingly urge the latter in order to provide meshing engagement between the second filter drive gear 12 and the rack 1A of the blue filter 1 (In FIG. 2, a pivot shaft P is provided. When the first cam 16 is pivotally moved about an axis of the pivot shaft P, the first cam 16 abuts an end face of the blue filter to move the latter in a direction indicated by an arrow A). The second cam 17 is positioned in alignment with the red filter 2 so as to pivotingly urge the latter in order to provide meshing engagement between the second filter drive gear 12 and the rack 2A of the red filter 2. The first and second cams 16 and 17 have vertical height different from each other and are linearly aligned with each other. Further, these cams 16,17 are coupled to the pivot shaft P connected to the cam drive motor 15 rotatable in one direction. The springs 1B of the urging means have one ends connected to the blue filter 1 and another ends connected to a stationary portion such as a machine frame so as to normally urge the blue filter 1 to a direction opposite the direction A in order to move the blue filter 1 to disengage the rack 1A from the second filter drive gear 12. the springs 2B of the urging means have one end connected to the red filter 2 and another ends connected to the stationary portion so as to normally urge the red filter 2 to a direction opposite the direction A in order to move the red filter 2 to disengage the rack 2A from the second filter drive gear 12.

Incidentally, the photosensitive sheet 4 used in this embodiment is described in a U.S. Pat. No. 4,399,209. More specifically, the sheet 4 includes a base substrate and microcapsules coated thereover. These microcapsules encapsulate therein photocurable resin whose hardness is changeable in accordance with light irradiation, a photopolymerization initiator, and a chromogenic material or dye precursor. Further, in a transfer type image recording medium, developer material is coated on a separate substrate as a separate developer or copy sheet. The developer sheet is superposed with the photosensitive sheet 4 for pressure developing operation. On the other hand, a self-contained type image recording medium is also available as the sheet 4. In the self-contained type, an encapsulated chromogenic material or dye precursor and a developer material are codeposited on one surface of a single substrate as one layer or as two contiguous layers. The self-contained type image recording medium is disclosed in U.S. Pat. No. 4,399,209.

Operation mode will next be described. For red color exposure, only the red filter 2 must be moved to the optical path extending between the CRT 5 and the photosensitive sheet 4, and other filters must be offset from the optical path. Assuming that all filters 1 thru 3 are originally positioned out of the optical path as shown in FIG. 4(e), and the red filter 2 is intended to be moved into the optical path. To this effect, the cam drive motor 15 is rotated in one direction to move the first and second cams 16 and 17 by angularly 90 degrees in one direction (counterclockwise direction in FIG. 2), so that the second cam 17 is brought into abutment with the red filter 2 to urge the latter in the direction A against the biasing force of the springs 2B, 2B. Upon this movement of the red filter 2, the rack 2A of the filter 2 is brought into meshing engagement with the second filter drive gear 12. Upon this engagement, the drive motor 7 is rotated in one direction (counterclockwise direction in FIG. 2), so that the second filter drive gear 12 is rotated in opposite direction (clockwise direction in FIG. 2) to further move the red filter 2 in the direction A. As a result, only the red filter 2 is positioned at the optical path as shown in FIG. 4(a). In this case, since the first drive gear 10 is rotated in one direction (counterclockwise direction in FIG. 2) by way of the first idle gear 9a, the green filter 3 whose rack 3A is always in engagement with the gear 9a is moved in a direction opposite the direction A as shown by a solid line in FIG. 2.

Then, an image data indicative of red color is supplied to the CRT 5, so that corresponding monochromatic image is displayed on the CRT screen. This image is focussed on the photosensitive sheet 4 through the red filter 2, so that the photosensitive sheet 4 is exposed for a predetermined period to light containing red color image information.

Upon completion of the exposure, the cam drive motor 15 is again energized to provide its rotation in the one direction (counterclockwise direction in FIG. 2), so that the first and second cams 16 and 17 are further angularly rotated by 90 degrees in the one direction. By this angular movement of the first and the second cams 16 and 17, these cams are moved away from the blue filter 1 and the red filter 2. With maintaining this state, the drive motor 7 is rotated in opposite direction (clockwise direction in FIG. 2) for a predetermined period. Accordingly, the second filter drive gear 12 is rotated in one direction (counterclockwise direction in FIG. 2), so that the red filter 2 is moved away from the optical path (in the direction opposite the arrow A). By this movement, the rack 2A becomes disengaged from the second filter drive gear 12, so that the red filter 2 is further moved toward its rest position because of the biasing force of the springs 2B, 2B.

The rotation of the drive motor 7 in the opposite direction (clockwise direction in FIG. 2) also provide rotation of the first filter drive gear 10 in the opposite direction (clockwise direction). Therefore, the green filter 3 is moved toward the optical path as shown in FIG. 4(b). Importantly, the retracting movement of the red filter 2 and the advancing movement of the green filter 3 are achievable simultaneously by the rotation of the drive motor 7. Therefore, filter switching operation requires minimized period.

With maintaining this state, an image data indicative of green color is supplied to the CRT 5, so that corresponding monochromatic image is displayed on the CRT screen. This image is focussed on the photosensitive sheet 4 through the green filter 3, so that the photosensitive sheet 4 is exposed for a predetermined period to light containing green color image information.

Upon completion of the exposure, the cam drive motor 15 is again energized to provide its rotation in the one direction (counterclockwise direction in FIG. 2), so that the first and second cams 16 and 17 are further angularly rotated by 90 degrees in the one direction. By this angular movement of the first and the second cams 16 and 17, the blue filter 1 is moved in the direction A by the first cam 16 against the biasing force of the springs 1B, 1B. Therefore, the rack 1A of the blue filter 1 is brought into meshing engagement with the second filter drive gear 12. With maintaining this state, the drive motor 7 is rotated in one direction (counterclockwise direction in FIG. 2) for a predetermined period. Accordingly, the first filter drive gear 10 is rotated in one direction (counterclockwise direction in FIG. 2), so that the green filter 3 is moved away from the optical path (in the direction opposite the arrow A). On the other hand, the second filter drive gear 12 is rotated in opposite direction (clockwise direction in FIG. 2), so that the blue filter 1 is further moved in the direction A. By this movement, the blue filter is brought into the optical path as shown in FIG. 4(c). Importantly, the retracting movement of the green filter 3 is made concurrent with the advancing movement of the blue filter 1.

Then, an image data indicative of blue color is supplied to the CRT 5, so that corresponding monochromatic image is displayed on the CRT screen. This image is focussed on the photosensitive sheet 4 through the blue filter 1, so that the photosensitive sheet 4 is exposed for a predetermined period to light containing blue color image information.

Upon completion of the exposure, the cam drive motor 15 is again energized to provide its rotation in the one direction (counterclockwise direction in FIG. 2), so that the first and second cams 16 and 17 are further angularly rotated by 90 degrees in the one direction. By this angular movement of the first and second cams 16 and 17, these cams are moved away from the blue filter 1 and the red filter 2. With maintaining this state, the drive motor 7 is rotated in opposite direction (clockwise direction in FIG. 2) for a predetermined period. Accordingly, the second filter drive gear 12 is rotated in one direction (counterclockwise direction in FIG. 2), so that the blue filter 1 is moved away from the optical path (in the direction opposite the arrow A). By this movement, the rack 1A becomes disengaged from the second filter drive gear 12, so that the blue filter 1 is further moved toward its rest position because of the biasing force of the springs 1B, 1B.

The rotation of the drive motor 7 in the opposite direction (clockwise direction in FIG. 2) also provide rotation of the first filter drive gear 10 in the opposite direction (clockwise direction). Therefore, the green filter 3 is again moved toward the optical path as shown in FIG. 4(d). Importantly, the retracting movement of the blue filter 1 and the advancing movement of the green filter 3 are achievable simultaneously by the rotation of the drive motor 7. Therefore, filter switching operation requires minimized period. Resultant state is similar to the state shown in FIG. 4(b) except the orientation of the cams 16 and 17. However, in both cases, the cams 16 and 17 have their idling states.

After the state shown in FIG. 4(d), the drive motor 7 is rotated in one direction (counterclockwise direction in FIG. 2) for a predetermined period. Therefore, the first filter drive gear 10 is rotated in the one direction (counterclockwise direction in FIG. 2) to move the green filter 3 in the direction away from the optical path. By the rotation of the drive motor 7 in the one direction, the second filter drive gear 12 is rotated in the opposite direction (clockwise direction in FIG. 2). However, since both the blue and red filters 1 and 2 maintain their resting positions by the biasing forces of the springs 1B, 1B and 2B, 2B, their racks 1A and 2A are not engaged with the second filter drive gear 12. Accordingly, all three filters are positioned away from the optical path as shown in FIG. 4(e).

With maintaining this state, an image data indicative of white color is supplied to the CRT 5, so that corresponding monochromatic image is displayed on the CRT screen. This image is focussed on the photosensitive sheet 4 without any filters so that the photosensitive sheet 4 is exposed for a predetermined period to light containing white color image information.

As described above, one of the blue, red and green filters 1, 2 and 3 can be selectively positioned on the optical path. This is due to the fact that (a) the first filter drive gear 10 and the second filter drive gear 12 are rotated in directions opposite to each other, (b) the racks 1A and 1B of the blue and red filters can be selectively engageable with the second filter drive gear 12 in response to the position of the first and the second cams 16 and 17, and (c) the green filter 3 is always in meshing engagement with the first filter drive gear 10.

It should be noted that the photosensitive sheet 4 maintains its stationary position for successive exposures so as to form a latent image thereon. Upon these exposures, the light exposed microcapsules are photocured, whereas non-light exposed microcapsules maintain their original hardness. In case of the transfer type image recording medium, the photosensitive sheet 4 carrying the latent image is superposed with the developer sheet, and are pressed together by a pressure developing unit. The non-photocured microcapsules are ruptured by the pressure, so that chromogenic materials flow out of the ruptured microcapsules to react with the developer material. As a result, a visible output image is provided on the developer sheet.

In the above described embodiment, CRT 5 is used as an exposure light source. However, a halogen lamp can be used in conjunction with an employment of a color film. The light emitted from the halogen lamp passes through the color film, and the image of the film can be focussed on the photosensitive sheet 4. In the latter case, instead of the employments of the red, green and blue filters, complementary cyan, magenta and yellow filters are to be used. By controlling the exposure period through these filters, hue can be changed.

Further, in the above described embodiment, three independent filter members are used. However, each of the filter members can be the combined filters. For example, the red filter member 2 can be substituted by a combined red and blue filters arranged in a linear array as described in a co-pending U.S. Pat. application Ser. No. 260,034.

In view of the foregoing, according to the present invention, provided are the drive mechanism 6 including the first and second filter drive gears 10 and 12 and the switch mechanism 14 including the cams 16 and 17 for selectively engaging the filter member with the second filter drive gear in order to simultaneously replaces the one of the filter members positioned at the optical path with remaining one of the filter members. Therefore, compact filter unit results, and filter switching operation can be carried out in a minimized period. Further, since all of the filter members can be positioned offset from the optical path to perform white light exposure. Therefore, clear framing can be effected to the non-color image zone by using the white light exposure. Accordingly, no special equipment is required for obtaining the framing image.

While the invention has been described in detail and with reference to specific embodiments thereof, it would be apparent to those skilled in the art that various changes and modifications can be made therein without departing from the spirit and scope of the invention.

What is claimed is:

1. A filter unit positioned adjacent an optical path defined between an exposure source and an image recording medium comprising:
    (a) a plurality of filter members comprising;
        a first filter member having a first color filter and a first external frame formed with a first rack;
        a second filter member having a second color filter and a second external frame formed with a second rack; and
        a third filter member having a third color filter and a third external frame formed with a third rack;
    (b) a filter drive mechanism comprising
        a first drive source;
        a first filter drive gear driven by the first drive source and continuously engageable with a first rack,
        a second filter drive gear driven by the first drive source and engageable with one of the second and third racks, the second filter drive gear being rotated in a direction opposite the rotating direction of the first filter drive gear; and
    (c) a switch mechanism for providing selective engagement of one of the second and third racks with the second filter drive gear.

2. The filter unit as claimed in claim 1, wherein the first drive source is selectively rotatable in one direction and another direction;
    and wherein the first filter drive gear is rotated in a direction the same as the rotating direction of the first drive source, the first filter member being introduced into the optical path in response to the rotation of the first filter drive gear in the one direction, and being retractable from the optical path in response to the rotation of the first filter drive gear in the another direction;
    and wherein the one of the second and third filter members is introduced into the optical path in response to the rotation of the second filter drive gear in the one direction, and is retracted therefrom in response to the rotation of the second filter drive gear in the another direction.

3. The filter unit as claimed in claim 1, wherein the switch mechanism comprises:
    a second drive source rotatable in one direction;
    urging means connected to the second drive source for selectively urging one of the second and third filter members toward the optical path to provide engagement of one of the second and third racks with the second filter drive gear; and
    biasing means connected to the second filter member and the third filter member for retracting the second and third filter members from the optical path when one of the second and third racks is disengaged from the second filter drive gear.

4. The filter unit as claimed in claim 2 wherein the switch mechanism comprises:
    a second drive source rotatable in one direction;
    urging means connected to the second drive source for selectively urging one of the second and third filter members toward the optical path to provide engagement of one of the second and third racks with the second filter drive gear; and biasing means connected to the second filter member and the third filter member for retracting the second and third filter members from the optical path when one of the second and third racks is disengaged from the second filter drive gear.

5. The filter unit as claimed in claim 4, wherein each of the filter members have their rest positions offset from the optical path, the filter units being stackedly arranged at their rest positions.

6. The filter unit as claimed in claim 5, wherein the urging means comprises:
   a pivot shaft connected to the second drive source;
   a first cam member coupled to the pivot shaft and positioned in alignment with the second filter member and abuttable thereagainst to urge the second filter member;
   a second cam member coupled to the pivot shaft and positioned in alignment with the third filter member and abuttable thereagainst to urge the third filter member, the first and second cam member having vertical height different from each other and extending in a linear alignment with each other.

7. The filter unit as claimed in claim 5, wherein the biasing means comprises a first set of springs connected to the second filter member for moving the second filter member to its rest position, and a second set of springs connected to the third filter member for moving the third filter member to its rest position.

8. The filter unit as claimed in claim 1, wherein at least one of the first, second and third color filter comprises a single color filter.

9. The filter unit as claimed in claim 1, wherein at least one of the first, second and third color filter comprises a plurality of color filters having colors different from each other and arranged side by side within at least one of the first, second and third external frames.

10. A filter unit positioned adjacent an optical path defined between an exposure source and an image recording medium comprising:
   (a) a plurality of filter members comprising;
      a first filter member having a first color filter and a first external frame formed with a first rack;
      a second filter member having a second color filter and a second external frame formed with a second rack; and
      a third filter member having a third color filter and a third external frame formed with a third rack;
   (b) a filter drive mechanism comprising
      a first drive source selectively rotatable in one direction and another direction;
      a first filter drive gear driven by the first drive source and continuously engageable with a first rack, the first filter drive gear being rotated in a direction the same as the rotating direction of the first drive source, the first filter member being introduced into the optical path in response to the rotation of the first filter drive gear in the one direction, and being retracted from the optical path to restore its rest position in response to the rotation of the first filter drive gear in the another direction;
      a second filter drive gear driven by the first drive source and selectively engageable with one of the second and third racks, the second filter drive gear being rotated in a direction opposite the rotating direction of the first filter drive gear, the one of the second and third filter members being introduced into the optical path in response to the rotation of the second filter drive gear in the one direction, and being retracted therefrom to restore their rest positions in response to the rotation of the second filter drive gear in the another direction; and
   (c) a switch mechanism for providing engagement of one of the second and third racks with the second filter drive gear; the switch mechanism comprising
      a second drive source rotatable in one direction;
      urging means connected to the second drive source for selectively urging one of the second and third filter members toward the optical path and
      biasing means connected to the second filter member and the third filter member for retracting the second and third filter members from the optical path, the first, second and third filter members being selectively restoring their rest positions simultaneously to provide a white light irradiation onto the image recording medium.

* * * * *